United States Patent [19]

Elsner et al.

[11] 4,027,565

[45] June 7, 1977

[54] REVOLVING SHEARS FOR HIGH SPEED SEVERING

[75] Inventors: Wolfgang Elsner, Ratingen; Jorn Moslener, Angermund; Alfons Langenstuck, Duisburg, all of Germany

[73] Assignee: Demag Aktiengesellschaft, Duisburg, Germany

[22] Filed: Nov. 21, 1975

[21] Appl. No.: 634,165

[30] Foreign Application Priority Data

Nov. 29, 1974 Germany .......................... 2456431

[52] U.S. Cl. ............................................... 83/337
[51] Int. Cl.² .......................................... B26D 3/22
[58] Field of Search ............................. 83/337, 338

[56] References Cited

UNITED STATES PATENTS

| | | | |
|---|---|---|---|
| 1,965,523 | 7/1934 | Macfarren | 83/337 X |
| 3,057,239 | 10/1962 | Teplitz | 83/337 |
| 3,641,858 | 2/1972 | Tuschy et al. | 83/337 |
| 3,844,091 | 10/1974 | Vedvik et al. | 83/337 X |

FOREIGN PATENTS OR APPLICATIONS

| | | | |
|---|---|---|---|
| 23,783 | 9/1962 | Germany | 83/337 |
| 1,234,506 | 2/1967 | Germany | 83/338 |

*Primary Examiner*—Frank T. Yost
*Attorney, Agent, or Firm*—Mandeville and Schweitzer

[57] ABSTRACT

A device is provided for the high speed severing into lengths of an elongated material product issuing continuously at high speeds from refined steel mills or wire mills. The product may be rolled wire, for example, moving continuously from the mill through rotating guides. The invention incorporates cooperating radially movable shears directly into two cooperating rotating guides for the wire. The shears are connected to reversible pressure fluid piston and cylinder arrangements also incorporated into the cooperating rotating guides. Actuation of the shears from retracted to cutting positions and vice versa is through pressure fluid lines positioned in the axis of the rotating guides and connected to controls for coordinating the speed of the material to be cut and the speed of the rotating guides with the movement of the shears.

3 Claims, 2 Drawing Figures

REVOLVING SHEARS FOR HIGH SPEED SEVERING

BACKGROUND OF THE INVENTION

Rotating shears known in continuous refined iron mills and/or wire mills are limited in their capacity due to the time required for moving the blades into operating position, and then returning them. As will be appreciated, opposed rotating guides are used to move the material and since the material guides rotate at about rolling speed, it takes about three fourths of a revolution of the guides to extend or retract the cutting blades. At higher material speeds of around 40 meters per second, which is generally the current speed being used, considerable effort is needed for acceleration and deceleration of the bulk comprised of the blades and the associated devices for moving them, let alone at a required coordinated speed. In addition, even though rolling speeds of better than 50 m/sec. are presently technically available such rotating shears cannot be utilized because their bulk cannot be moved fast enough, and it is, therefore, necessary to resort to other known cutting arrangements, which result in uneven and inaccurate cuts.

STATEMENT OF THE INVENTION

With this invention, by contrast, an arrangement of rotating shears is provided which permit the cutting of material in a precise manner, and safely with that material moving at much higher linear speeds than were possible in the past. The arrangement of the invention provides for the positioning of reversible piston and cylinder units in the rotating material guides, and revolving with them to effect the displacement of the cutting blades. By connecting each of the blades directly to the piston of a reversible unit, it is possible to keep the mass of bulk to be moved for each cutting action at a minimum, which greatly increases the speed of the blades. Preferably, the reversible units are hydraulically actuated by appropriate servo valves in a control unit, which, in turn, are preferably mounted directly adjacent the reversible piston and cylinder units. It will be appreciated, however, by practitioners in the art that pneumatic controls may also be used.

While it is not necessary, preferably, the fluid pressure supplied to the piston and cylinder units is through the shafts of the rotating guides carrying the units. Alternatively, pressure fluid may be supplied via a rotary transmitting connection mounted to the front facing of the rotating guides with appropriate seals.

As will be appreciated, not only cutting lengths equal to the guide circumference can be cut with the apparatus of the invention, but also variation of the cutting lengths can be achieved by decelerating and accelerating the rotating guides carrying the blades. By doing so, the circumferential speed of revolution of the guides is briefly increased or decreased in relation to the linear speed of the material being cut. The invention provides, therefore, rotating shears which make it possible to employ considerably higher rolling speeds in modern rolling mills. As will be appreciated, further, it is within the purview of this invention to use only one movable blade, rather than two movable opposed blades.

With the foregoing objects in view, this invention will now be described in more detail and other objects and advantages thereof will be apparent from the following detailed description of the drawings, illustrating an embodiment of the invention.

Figure 1:
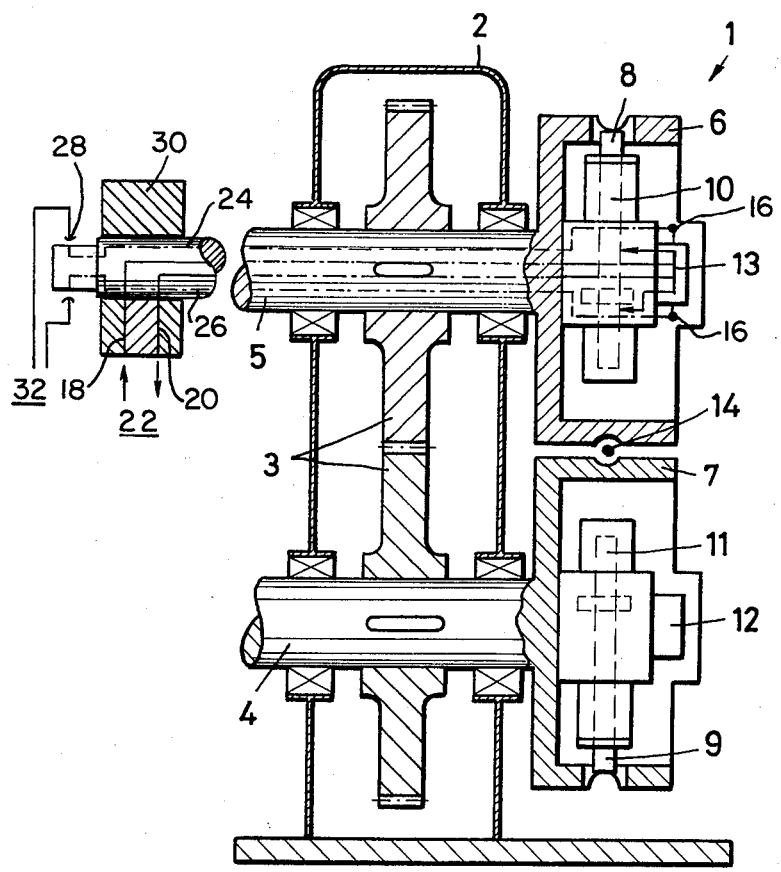
FIG. 1 is an elevated sectional view of cooperating rotating guides for guiding the linear movement of wire issuing from a wire mill, and embodying the cutting apparatus of the invention.
Figure 2:
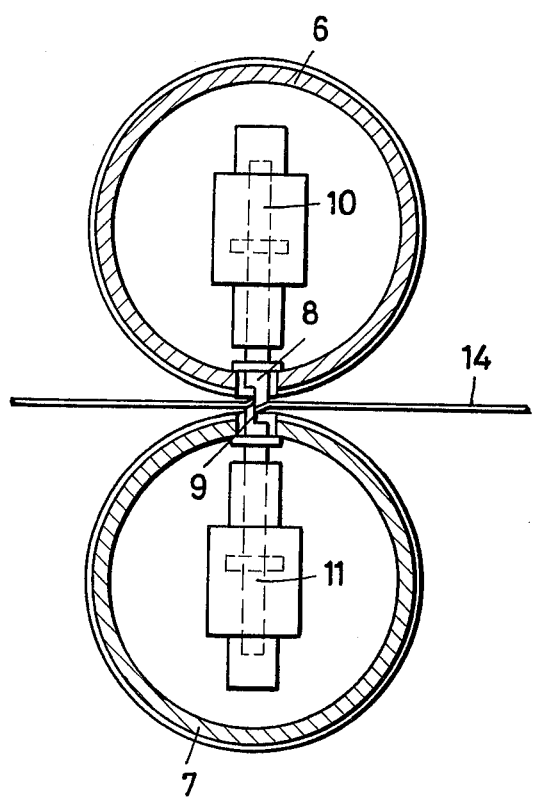
FIG. 2 is a somewhat simplified diagrammatic side elevation of the guides of FIG. 1, showing the internal cooperating arrangement of the blades and their associated actuating devices.

Referring to the drawings, in which like reference numerals refer to like parts throughout the several views thereof, 1 in FIG. 1 represents generally the rotating guides incorporating shears, according to the invention, driven by cooperating gears 3 located in casing 2. Rotating material guides 6, 7 are arranged on gear shafts 4, 5, respectively. Blades 8, 9 are driven by piston cylinder units 10, 11, respectively, which are controlled, in turn, by hydraulic servo controls 12, 13, respectively. The rolled material is designated by 14.

Referring to FIG. 1, the operation of servo valve 13 only is shown and described since servos 12 and 13 operate in the same manner, as will be appreciated. Pressure fluid is directed to and withdrawn from unit 10 through lines 18 and 20, passing through shaft 5, from a pressure fluid source 22 adjacent the rotary transmission 30 on an extension of shaft 5. Control of the pressure fluid to unit 10 is by a conventional servo valve 13 connected at 16 to control lines 24, 26, also passing through shaft 5 to slider contacts 28 at a journal of shaft 5, which contacts are connected to a conventional switching and power source 32.

Material guides 6, 7 revolve at very high speed with the circumferential speed thereof corresponding approximately to the linear speed of rolled material 14. In order to avoid drag on the rolled material when cutting with blades 8, 9, the circumferential speed of material guides 6, 7 is preferably slightly higher than that of the linear speed of rolled material 14. The speed of guides 6, 7 is controlled through their respective shafts 5, 4, as will be understood. As soon as blades 8, 9 have finished the cutting process, the retraction process takes place which must be completed when the opening for the blades in the material guides 6, 7 enters adjacent the area of rolled material 14. Depending upon the speeds involved and the coordination required thereby, the blades may be retracted when the opening for blades 8, 9 in material guides 6, 7 departs from the rolled material, so that almost the duration of one revolution of guides 6, 7 remains for the process of extending the blades for the next cutting action. By proper regulation of the switch point of piston and cylinder units 10, 11 in combination with regulation of the revolving speed of material guides 6, 7, the cut may be applied at any given point in rolled material 14 moving at high speed. Due to the speed with which blades 8 and 9 and their associated drives can change direction, the cutting process may be executed with this invention at wire speeds well over 50 m/sec., and up to speeds of 100 m/sec. and better.

While the apparatus herein disclosed from preferred embodiments of the invention, this invention is not limited to those specific forms of apparatus, and changes can be made therein without departing from the scope of the invention, which is defined in the appended claims.

We claim:
1. A shearing device for cutting rolled material, such as wire moving at high linear speeds into lengths comprising a pair of cooperating rotating guides for guiding said rolled material linearly, and a radially displaceable cutting blade in each said guide for cooperating movement into and out of the path of said rolled material, characterized by
   a. an hydraulic reversible fluid pressure piston and cylinder unit disposed in each said rotating guide and rotatable therewith;
   b. the piston of each said unit connected directly to said radially movable cutting blade in its respective rotating guide;
   c. servo-control means connected to each said piston and cylinder units for the cooperative actuation thereof to cut said rolled material into lengths; and
   d. said servo-control means for each said reversible piston and cylinder unit is mounted on said rotating guides adjacent their respective reversible unit.
2. The apparatus of claim 1, further characterized by
   a. each of said rotating guides mounted on drive shafts; and
   b. said actuating means including pressure fluid lines passing through said drive shafts.
3. The apparatus of claim 2, further characterized by
   a. the speed of said drive shafts being adjustable.

* * * * *